April 13, 1926. 1,580,322
C. R. PARKER
FLUID BRAKE
Filed Nov. 17, 1924
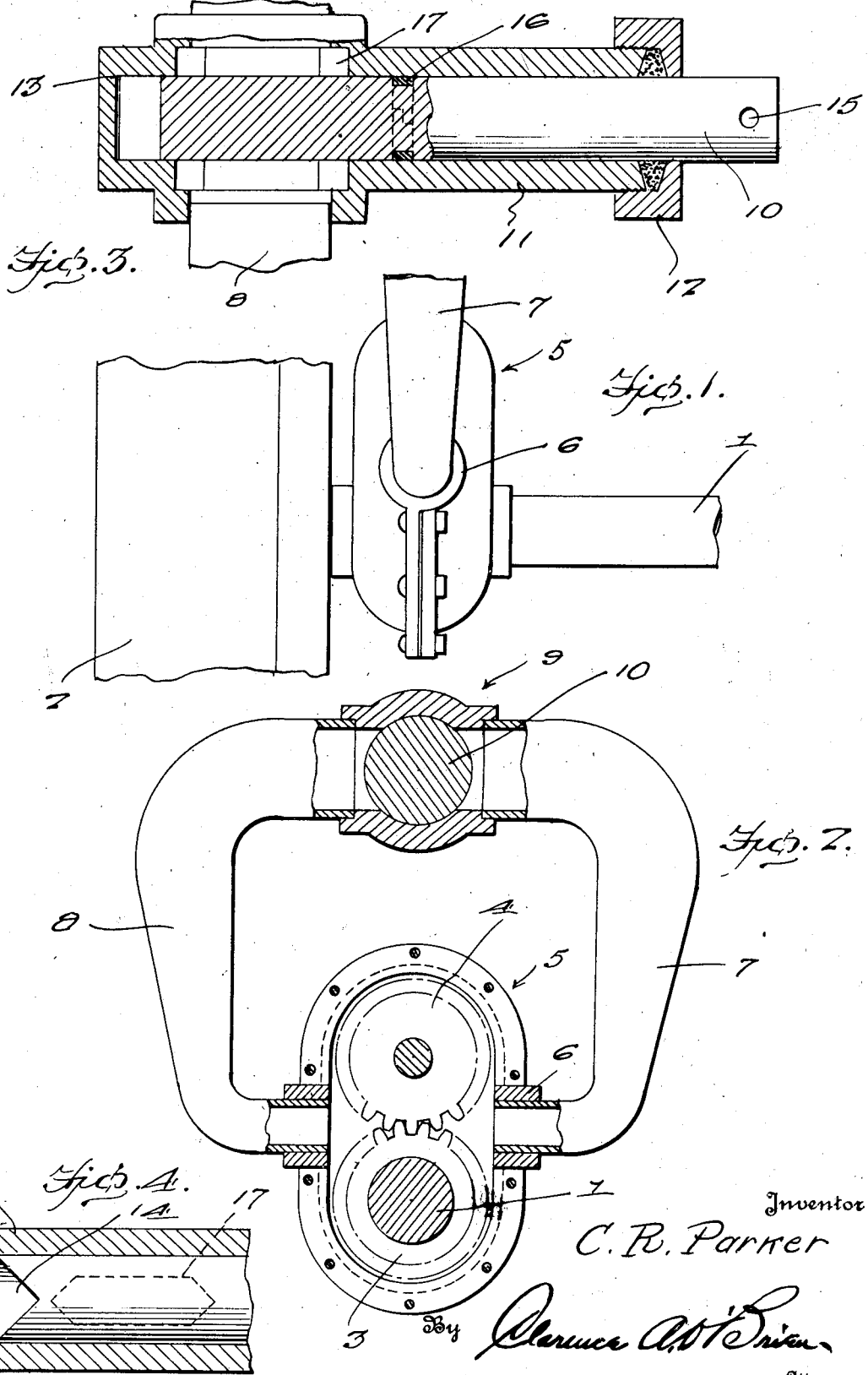
Inventor
C. R. Parker
By Clarence A. O'Brien
Attorney Patented Apr. 13, 1926.

1,580,322

UNITED STATES PATENT OFFICE.

CHARLES R. PARKER, OF KANKAKEE, ILLINOIS.

FLUID BRAKE.

Application filed November 17, 1924. Serial No. 750,291.

*To all whom it may concern:*

Be it known that I, CHARLES R. PARKER, a citizen of the United States, residing at Kankakee, in the county of Kankakee and State of Illinois, have invented certain new and useful Improvements in Fluid Brakes, of which the following is a specification.

This invention relates to an improved fluid brake which is specially, but not necessarily adapted for use upon automobiles and analogous vehicles.

The principal object is to provide a comparatively simple construction of the above class embodying a gear casing, and a valved fluid passage, which is connected with the casing, and through which the fluid is circulated to permit free operation of the gearing when the valve is open, or to lock the gearing when the valve is closed.

It is a feature to provide a gear casing, which is composed of sections, in which a gearing may be housed, the sections being constructed to permit them to be fastened upon an automobile axle between the differential structure and one of the driving wheels.

Other features and advantages of the invention will become apparent from the following description and drawing.

In the accompanying drawing, forming a part of this specification, and in which like numerals are employed to designate like parts throughout the same:

Figure 1 is an elevational view of a driven shaft, with a rotor or the like, attached to one end, showing a portion of the improved pump or fluid brake in association therewith.

Figure 2 is a view, partly in section, and partly in elevation, of a brake constructed in accordance with the present invention.

Figure 3 is an enlarged detail sectional view of the valve structure of the improved brake.

Figure 4 is a detail view, showing the special construction of the slide valve.

Referring to the drawing, and more particularly to Figure 1, it may be assumed that the reference character 1 designates a rotary driven shaft, on one end of which is fixed a rotary element 2. In practice, it may be the rear driven axle of an automobile and the drive wheel mounted on the outer end thereof. As seen in Figure 2, a gear 3 is fixed to this shaft, and this gear is in mesh with an idler gear 4, journaled for rotation within a gear casing 5. The casing in use would preferably be disposed between the differential and one of the drive wheels. This casing, with the gearing therein may be referred to as a gear pump. One section of the casing is constructed to provide fluid passage necks 6, and to these necks a pair of duplicate tubular branches 7 and 8 are connected. It will be observed that the branches and their points of connection with the neck 6 are comparatively small in diameter and substantially increase in diameter toward their opposite ends. At the last named ends they are spaced apart, and a coupling or connection 9 is interposed therebetween and connected therewith. The coupling is of special construction, and is constructed, as seen in Figure 3 to provide a housing for a sliding valve 10, that is, the coupling is provided with an extension 11, carrying a stuffing box 12, and is provided opposite the extension with a cup-shaped portion 13 to accommodate the adjacent end of the valve. It will be apparent from Figure 4 that the last named end of the valve is provided with a V-shaped notch 14. The opposite end of the valve is provided with a hole 15, to which a suitable manually operated control means may be connected. If desired, the valve may be equipped with a packing ring 16 to provide a fluid tight joint between itself and the bearing 11. Here I would direct attention to the fact that the fluid passage opening 17, leading from the branches to the coupling 9 are of the shape more plainly shown in Figure 4. Referring to this figure, it will be seen that the opposite ends of the passages are reduced in width, and it is obvious that in this arrangement, and with the V-shaped notch 14 in the valve, the control of the fluid through the branches may be regulated.

Assuming now that the shaft 1 is one section of the rear axle of an automobile, and that the element 2 is the drive wheel fixed thereto, and that the casing 5 is fixed to the axle housing or the like, the operation of the device is as follows: With the casing and tubular ducts filled with fluid, say for instance, oil, it is clear that when the slide valve 10 is entirely closed, fluid will be prevented from circulating through the ducts. Under such conditions, the oppositely rotating gears 3 and 4 will be locked against rotation, and a braking action will be had upon the axle. However, when the valve 10 is opened, fluid is permitted to circulate through the passages, and free rotation of the gearing is permitted. It is thought that a careful consideration of the foregoing description, in connection with the accompanying drawing will enable the persons skilled in the art to which the invention relates to obtain a clear understanding of the same. For this reason, a more lengthy description is thought unnecessary.

From the foregoing description, it would appear that the improved brake structure is restricted for disposition between an automobile differential, and a rear driving wheel. I wish it to be understood that the invention is not, in any sense, to be limited to this particular use. For instance, it will serve quite well as a transmission brake, in which case it will be installed upon the transmission shaft between the transmission mechanism and the reverse universal joint. In fact, the invention is usable, to advantage, to lock any kind of rotary shaft or its equivalent against rotation.

I claim:

1. A fluid brake comprising a gear casing, a shaft extending through said casing and having a gear fixed thereto, an idler gear journaled for rotation to said casing and in mesh with the first-named gear, a pair of oppositely disposed fluid conducting branches connected with said casing, said branches tapering so as to be smaller adjacent the casing, a coupling connecting the opposite ends of the branches together, and a slide valve carried by said coupling and adapted for simultaneously controlling the passage of fluid through said branches.

2. A fluid brake comprising a gear casing, a shaft extending through said casing and having a gear fixed thereto, an idler gear journaled for rotation to said casing and in mesh with the first-named gear, a pair of oppositely disposed fluid conducting branches connected with said casing, said branches tapering so as to be smaller adjacent the casing, a coupling connecting the opposite ends of the branches together, and a slide valve carried by said coupling and adapted for simultaneously controlling the passage of fluid through said branches, said coupling provided with openings for receiving the ends of the branches which are provided with ends tapering to perch and said slide valve provided with a V-shaped notched end the apex of which may be brought into contact with the points of the ends of the openings.

In testimony whereof I affix my signature.

CHARLES R. PARKER.